United States Patent
Bolton et al.

(10) Patent No.: US 10,585,727 B1
(45) Date of Patent: Mar. 10, 2020

(54) API MANAGER

(71) Applicant: Google LLC, Mountain View, CA (US)

(72) Inventors: Kyle Bolton, Cambridge, MA (US); Jacob Edward Ouellette, Quincy, MA (US); Wayne Chang, Boston, MA (US); Sam A. Neubardt, Somerville, MA (US)

(73) Assignee: Google LLC, Mountain View, CA (US)

( * ) Notice: Subject to any disclaimer, the term of this patent is extended or adjusted under 35 U.S.C. 154(b) by 119 days.

(21) Appl. No.: 15/596,751

(22) Filed: May 16, 2017

Related U.S. Application Data

(63) Continuation of application No. 15/177,251, filed on Jun. 8, 2016, now abandoned.

(60) Provisional application No. 62/172,649, filed on Jun. 8, 2015.

(51) Int. Cl.
  *G06F 9/54* (2006.01)
  *G06F 8/30* (2018.01)

(52) U.S. Cl.
  CPC ............ *G06F 9/546* (2013.01); *G06F 8/30* (2013.01)

(58) Field of Classification Search
  None
  See application file for complete search history.

(56) References Cited

U.S. PATENT DOCUMENTS

| | | | |
|---|---|---|---|
| 8,595,806 B1 | 11/2013 | Gabrielson et al. | |
| 8,793,359 B1 | 7/2014 | Fiebig et al. | |
| 2003/0236827 A1* | 12/2003 | Patel | H04L 41/0896 709/203 |
| 2005/0193093 A1 | 9/2005 | Mathew et al. | |
| 2008/0209451 A1 | 8/2008 | Michels et al. | |
| 2011/0004916 A1 | 1/2011 | Schiffman et al. | |
| 2011/0219267 A1 | 9/2011 | Migliasso et al. | |
| 2011/0307959 A1* | 12/2011 | Singh | G06F 9/44536 726/26 |
| 2012/0084791 A1* | 4/2012 | Benedek | G06F 13/14 719/313 |
| 2012/0180021 A1 | 7/2012 | Byrd et al. | |
| 2012/0180022 A1 | 7/2012 | Hopkins | |
| 2012/0246463 A1 | 9/2012 | Shea et al. | |
| 2013/0018948 A1 | 1/2013 | Douillet et al. | |
| 2013/0110726 A1 | 5/2013 | Pereira | |
| 2013/0275560 A1 | 10/2013 | Bestmann et al. | |
| 2014/0033273 A1 | 1/2014 | Rathbun | |
| 2014/0280913 A1 | 9/2014 | Karren et al. | |
| 2014/0317637 A1* | 10/2014 | Gadotti | G06Q 20/322 719/313 |

(Continued)

*Primary Examiner* — Chat C Do
*Assistant Examiner* — William C Wood
(74) *Attorney, Agent, or Firm* — Fish & Richardson P.C.

(57) ABSTRACT

A method for managing application programming interface (API) keys associated with third-party software development kits (SDKs). The method includes: receiving, from an application developer machine, a plurality of notifications identifying a plurality of third-party SDKs selected for installment in a mobile application under development; sending a plurality of API key provisioning requests to a plurality of third-party service providers including a plurality of third-party APIs corresponding to the plurality of third-party SDKs; receiving a plurality of API keys for the mobile application under development from the plurality of third-party service providers; and storing the plurality of API keys.

19 Claims, 9 Drawing Sheets

(56) References Cited

U.S. PATENT DOCUMENTS

2015/0347749 A1   12/2015   Kiehtreiber et al.
2016/0092344 A1    3/2016   Bally et al.
2016/0112262 A1    4/2016   Johnson et al.

* cited by examiner

API MANAGER

CROSS-REFERENCE TO REPLATED APPLICATIONS

This application is a continuation of U.S. patent application Ser. No. 15/177,251, filed on Jun. 8, 2016, which is a non-provisional application of U.S. Provisional Patent Application Ser. No. 62/172,649, filed on Jun. 8, 2015, which are hereby incorporated by referenced in their entirety.

BACKGROUND

Mobile application developers are using an increasing number of third-party services to provide additional features and capabilities in their mobile applications. Accessing these third-party services often require application programming interface (API) keys provided by the third-party services. Managing these API keys can be a burden for the mobile application developers. Similarly, managing the permissions associated with the API keys can be a burden for the third-party services. Regardless, mobile application developers still wish to use third-party services and third-party services still wish to provide additional features to the mobile applications.

SUMMARY

In general, in one aspect, the invention relates to a method for managing application programming interface (API) keys associated with third-party software development kits (SDKs). The method comprises: receiving, from an application developer machine, a plurality of notifications identifying a plurality of third-party SDKs selected for installment in a mobile application under development; sending a plurality of API key provisioning requests to a plurality of third-party service providers comprising a plurality of third-party APIs corresponding to the plurality of third-party SDKs; receiving a plurality of API keys for the mobile application under development from the plurality of third-party service providers; and storing the plurality of API keys.

In general, in one aspect, the invention relates to a method for managing application programming interface (API) keys associated with third-party software development kits (SDKs). The method comprises: receiving, by an API manager and from a mobile application comprising a plurality of third-party SDKs, a key request for a third-party SDK of the plurality of third-party SDKs; sending, by the API manager and in response to the key request, an API key provisioning request to a third-party service provider comprising a third-party API corresponding to the third-party SDK; receiving, by the API manager, an API key from the third-party service provider; and storing, by the API manager, the API key.

In general, in one aspect, the invention relates to a system for managing application programming interface (API) keys associated with third-party software development kits (SDKs). The system comprises: a key engine configured to send a plurality of API key provisioning requests to a plurality of third-party service providers comprising third-party APIs in response to a plurality of third-party SDKs being selected for installation on a mobile application under development; a repository storing a plurality of API keys and a plurality of conditions associated with the plurality of API keys received from the plurality of third-party service providers; and a developer portal configured to receive a key view request from a developer of the mobile application and send a data structure identifying the plurality of API keys and the plurality of conditions to the developer.

In general, in one aspect, the invention relates to a system for managing application programming interface (API) keys associated with third-party software development kits (SDKs). The system comprises: an integrated development environment (IDE) storing code for an application under development and comprising a plurality of third-party SDKs; and an API client application configured to: send, to an API manager, a plurality of notifications identifying the plurality of third-party SDKs; receive, from the API manager, a plurality of API keys in response to sending the plurality of notifications; and modify the code to include the plurality of API keys.

In general, in one aspect, the invention relates to a non-transitory computer readable medium (CRM) storing instructions for managing application programming interface (API) keys associated with third-party software development kits (SDKs). The instructions comprise functionality for: receiving, from an application developer machine, a plurality of notifications identifying a plurality of third-party SDKs selected for installment in a mobile application under development; sending a plurality of API key provisioning requests to a plurality of third-party service providers comprising a plurality of third-party APIs corresponding to the plurality of third-party SDKs; receiving a plurality of API keys for the mobile application under development from the plurality of third-party service providers; and storing the plurality of API keys.

In general, in one aspect, the invention relates to a non-transitory computer readable medium storing instructions for managing application programming interface (API) keys associated with third-party software development kits (SDKs). The instructions comprise functionality for: receiving, from a mobile application comprising a plurality of third-party SDKs, a key request for a third-party SDK of the plurality of third-party SDKs; sending, in response to the key request, an API key provisioning request to a third-party service provider comprising a third-party API corresponding to the third-party SDK; receiving an API key from the third-party service provider; and storing the API key.

DETAILED DESCRIPTION

Figure 1:
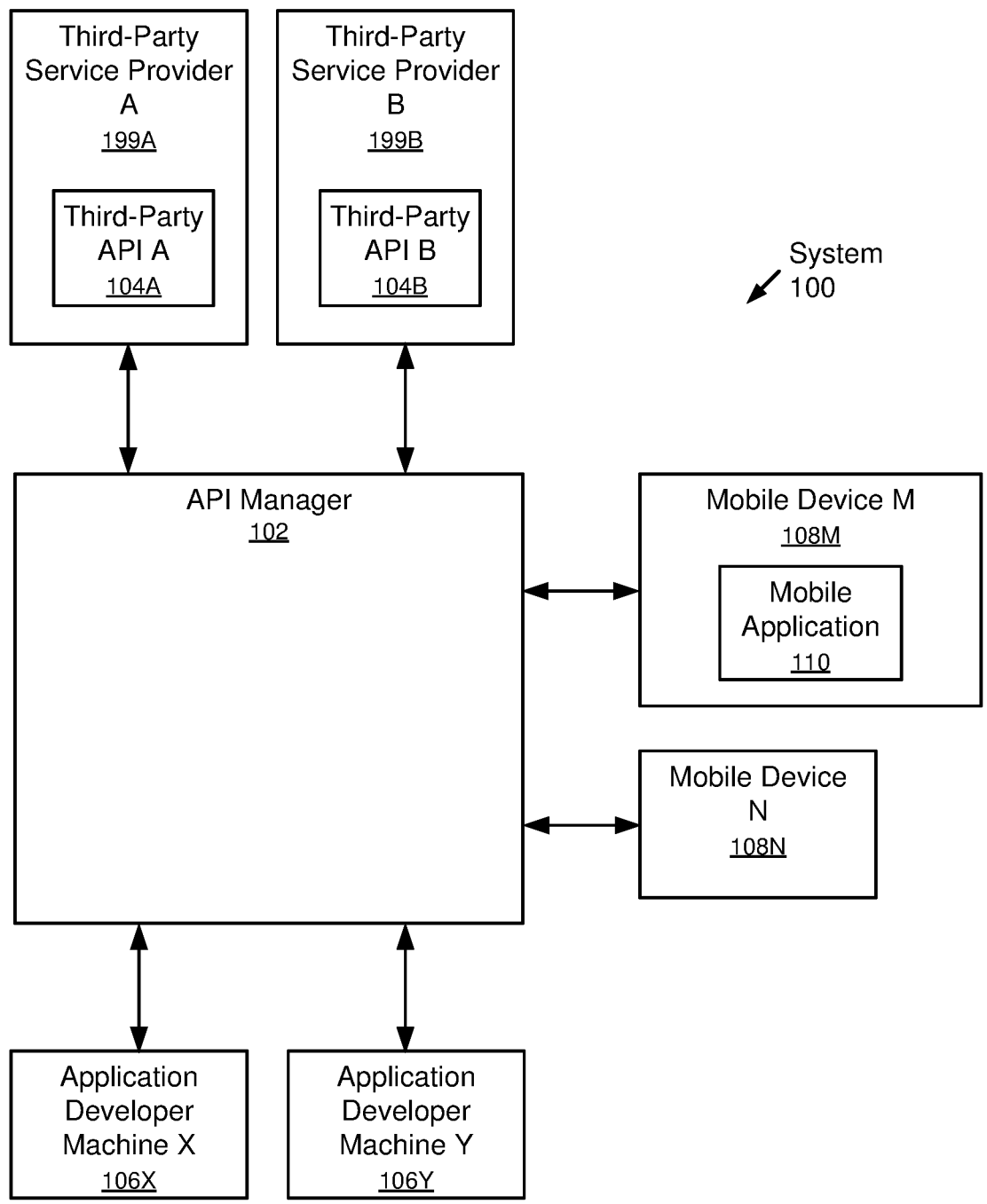
FIG. 1 depicts a system block diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method, a system, and a non-transitory computer readable medium (CRM) for managing application programming interface (API) keys associated with third-party software development kits (SDKs). Specifically, an API manager may act as an intermediary between multiple third-party service providers and one or more application developers. The API manager may also act as an intermediary (i.e., a trusted arbitrator) between the multiple third-party service providers and one or more mobile applications executing on mobile devices. The API manager may request API keys be provisioned for the mobile applications and process API calls from the mobile applications. The API manager may also provide a portal for application developers to view API keys and their conditions (e.g., permissions, restrictions, etc.), request reports on API usage, and request new API keys be generated if the existing ones are compromised. Similarly, the API manager may provide a portal for third-party service providers to provide upgrade notifications and request reports on the API keys. The API manager reduces burdens associated with the API keys on the application developer and the third-party APIs.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

FIG. 1 shows a system (100) in accordance with one or more embodiments of the invention. As shown in FIG. 1, the system (100) has multiple components including an API manager (102), multiple third-party service providers (e.g., Third-Party Service Provider A (199A), Third-Party Service Provider B (199B)) offering multiple third-party APIs (e.g., Third-Party API A (104A), Third-Party API B (104B)), one or more application developer machines (e.g., Application Developer Machine X (106X), Application Developer Machine Y (106Y)), and one or more mobile devices (e.g., Mobile Device M (108M), Mobile Device N (108N)). As also shown in FIG. 1, the third-party service providers (199A, 199B), the application developer machines (106X, 106Y), and the mobile devices (108M, 108N) are connected to the API manager (102) using one or more networks having wired and/or wireless segments. Although not shown in FIG. 1, the mobile devices (108M, 108N) may also be directly connected to the third-party service providers (199A, 199B) using one or more networks having wired and/or wireless segments. In other words, the mobile devices (108M, 108N) may communicate with the third-party service providers (199A, 199B) independently of the API manager (102).

In one or more embodiments of the invention, the system (100) includes the third-party service providers (199A, 199B). Each third-party service provider (199A, 199B) may execute on one or more computing devices (e.g., a server, a personal computer (PC), a laptop, a tablet PC, a smart phone, a kiosk, etc.). Each third-party service provider (199A, 199B) provides one or more services, functions, content, or capabilities that can be requested by a computing device (e.g., mobile device M (108M)) and/or a software application (e.g., mobile application (110)) external to the third-party service provider (199A, 199B). The third-party APIs (104A, 104B) are the mechanisms by which external computing devices can access the services, functions, content, or capabilities offered by the third-party service providers (199A, 199B). Accordingly, the requests for these services, functions, content, or capabilities from the external computing devices are in the form of API calls. Both these API calls and the corresponding outputs may be in a format particular to the third-party API (104A, 104B). Further, these API calls may need to include one or more input values (i.e., input parameters).

In one or more embodiments of the invention, each API call requires/includes an API key. The API key is a numeric or alphanumeric value (i.e., token) provisioned in advance by the third-party service provider (199A, 199B) for the computing device and/or software application. The third-party service provider (199A, 199B) may provision different API keys for different computing devices and/or software applications. The computing device and/or software application may reuse its API key for multiple API calls to the third-party API (104A, 104B). In one or more embodiments of the invention, the API key is associated with one or more conditions (e.g., permissions, restrictions, access rights, etc.). For example, an API key may only grant the computing device and/or software applications access to a subset of all functionalities or components. As another example, the API key may only be good for a predetermined number of requests in a session, hour, day, etc.

In one or more embodiments of the invention, each third-party API (104A, 104B) is associated with a third-party SDK (not shown). A third-party SDK may be included (e.g., installed) in a mobile application. The third-party SDK is a mechanism for the mobile application to issue API calls to the corresponding third-party API.

In one or more embodiments of the invention, the system (100) includes one or more application developer machines (106X, 106Y). Each application developer machine (106X, 106Y) may correspond to a server, a personal computer (PC), a laptop, a tablet PC, a smart phone, a kiosk, etc. The application developer machines (106X, 106Y) provide an interface (e.g., GUI) that an application developer or a team of application developers can utilize to design, program, code, debug, etc. a mobile application (e.g., Mobile Application (110)). In one or more embodiments of the invention, these mobile applications include one or more third-party SDKs and API keys that can make API calls to one or more third-party APIs (104A, 104B). The application developer machine (106X, 106Y) may obtain (e.g., for a fee) the SDKs and the API keys from the API Manager (102). Additional details regarding the application developer machines (106X, 106Y) are discussed below.

In one or more embodiments of the invention, the system (100) includes multiple mobile devices (i.e., Mobile Device M (108M), Mobile Device N (108N)). These mobile devices (108M, 108N) may correspond to smart phones, PC tablets, laptops, personal digital assistants (PDAs), watches, etc. These mobile devices (108M, 108N) may execute mobile applications (e.g., mobile application (110)) developed on the application developer machines (106X, 106Y). The mobile applications may be obtained (e.g., for a fee) from the API manager (102). The mobile application (110) may issue API calls to the third-party APIs (104A, 104B) during execution of the mobile application (110). These API calls may be transmitted to the third-party APIs (104A, 104B) via the API manager (102). Additionally or alternatively, these API calls may be transmitted directly to the third-party APIs (104A, 104B), bypassing the API manager (102).

In one or more embodiments of the invention, the system (100) includes the API manager (102). The API manager (102) acts as an intermediary (i.e., a trusted arbitrator) between the third-party APIs (104A, 104B), the mobile devices (108M, 108N), and the application developer machines (106X, 106Y). The API manager (102) may correspond to one or more servers, mainframes, PCs, or any other type of hardware computing devices. The API manager (102) may be part of an SDK platform and/or SDK marketplace. The API manager (102) may be configured to perform many functions including, for example, requesting the third-party service providers (199A, 199B) to provision API keys for the application developer machines (106X, 106Y); generating reference keys for a set of API keys; processing API calls made by the mobile application (110) executing on the mobile device M (108M); generating reports for application developers regarding the API keys and the conditions associated with the API keys in an mobile application; generating reports for third-party service providers regarding the third-party SDKs installed in mobile applications; providing authentication services/controls for application developers; enforcing conditions associated with API calls; facilitating message exchanges between the third-party service providers (199A, 199B) and the application developer machines (106X, 106Y); etc. Additional details regarding the API manager (102) are discussed below.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

Although FIG. 1 shows only two third-party APIs (104A, 104B), only two mobile devices (108M, 108N), and only two application developer machines (106X, 106Y), those skilled in the art, having the benefit of this detailed description, will appreciate that there may be any number of third-party APIs, mobile devices, and application developer machines. Similarly, each mobile device (108M, 108N) may execute any number of mobile applications.

Although FIG. 1 shows a mobile application (110) executing on mobile device (108N), in one or more embodiments of the invention, all systems and processes disclosed is this detailed description also apply to applications executing on non-mobile devices (e.g., desktop personal computers (PCs), kiosks, servers, mainframes, etc.). In such embodiments, the application developer machines (106X, 106Y) may develop applications for deployment on the non-mobile devices. Further, these applications executing on the non-mobile devices would also have third-party SDKs making API calls and communicating with the API manager (102).

Figure 2:
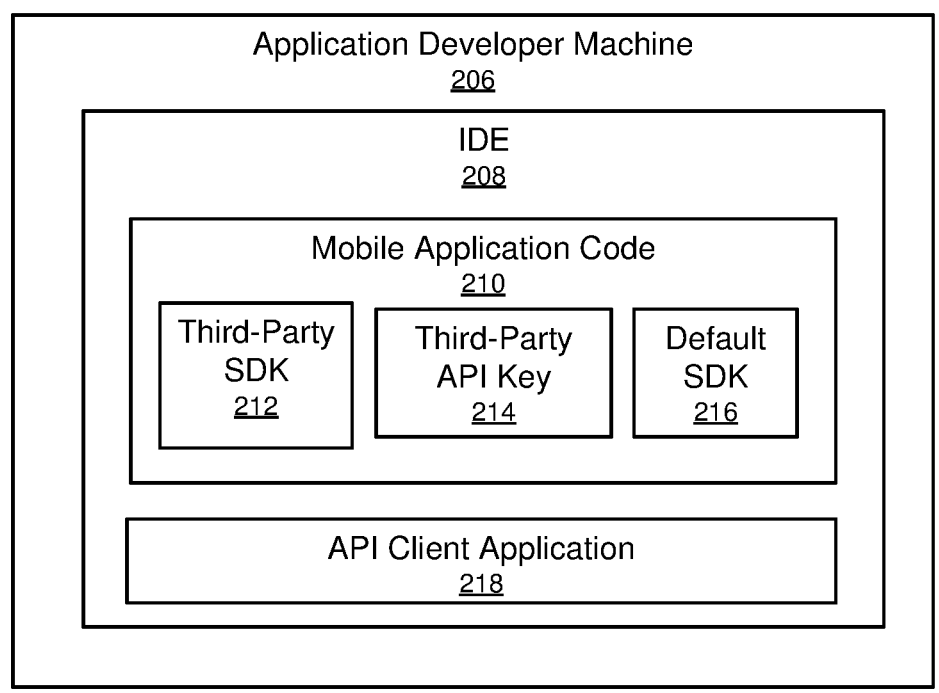
FIG. 2 shows an application developer machine in accordance with one or more embodiments of the invention.

FIG. 2 shows an application developer machine (206) in accordance with one or more embodiments of the invention. The application developer machine (206) may be essentially the same as the application developer machines (106X, 106Y) discussed above in reference to FIG. 1. In one or more embodiments of the invention, the application developer machine (206) includes an integrated development environment (IDE) (208). The IDE (208) is a software application that provides comprehensive facilities to application developers for the development of mobile applications. The IDE (208) may include a source code editor to write code (210) for the mobile application, build automation tools, and a debugger.

As shown in FIG. 2, the IDE (208) includes an API client application (218). In one or more embodiments of the invention, the API client application (218) is a plug-in to the IDE (208). Additionally or alternatively, the API client application (218) may be a software application that interacts with the IDE (208), but is external to the IDE (208) (i.e., not a plug-in). The API client application (218) facilitates development of a mobile application and communication with the API manager (102).

As discussed above, one or more third-party SDKs may be included (i.e., installed, incorporated, etc.) in a mobile application. Specifically, the application developer may be presented with a catalog of third-party SDKs that can be selected for inclusion with the mobile application under development. As also discussed above, when the mobile application is executing, each SDK may issue API calls to a third-party API to increase the functionality and capabilities of the mobile application.

As shown in FIG. 2, a third-party SDK (212) has been added to the code (210) for the mobile application. In one or more embodiments of the invention, the API client application (218) sends a notification (e.g., to the API manager (102)) identifying the third-party SDK (212) selected for inclusion with the mobile application. The notification may also identify the mobile application (e.g., numeric or alphanumeric ID of the mobile application) and/or the application developer. The notification may also identify the target operating system (OS) or version of the OS for the mobile application. The notification may also identify other third-party SDKs installed in the mobile application. The notification may include any information that is necessary to have the correct API keys generated for the third-party SDK (212). The API client application (218) may receive a third-party API key in response to the notification and may modify the code (210) of the mobile application under development to include the third-party API key. This modification may take place with minimal or no input from the application developer. As shown in FIG. 2, the code (210) has been modified to include the third-party API key (214) for use with/by the third-party SDK (212). The API client application (218) may also modify the code (210) to include a default SDK (216) for use in communicating with the API manager (102) during execution of the mobile application.

Those of ordinary skill in the art, having the benefit of this detailed description, will appreciate that because of the notifications, it is possible for the API manager (102) to determine all third-party SDKs installed in the mobile application at build-time (i.e., before deployment of the mobile application). Moreover, the API manager (102) may determine sets of third-party SDKs that are frequently installed together in mobile applications. For example, the API manager (102) may determine that for 90% of mobile applications in which third-party SDK X is installed, third-party SDK Y is also installed. The API manager (102) may provide this information to the third-party service responsible for SDK X and the third-party service responsible for SDK Y. This information provides the third-party services with additional insight as to how their SDKs are being used by application developers. This information would not be available without the API Manager (102). In other words, although the third-party services receive API calls during execution of the mobile application at run time, without the API Manager (102), the third-party services have limited visibility as to what other SDKs are also in the same mobile application as their SDK. One or both of these third-party services may update its third-party SDK to be easier to integrate with the other third-party SDK. Additionally or alternatively, one or both of these third-party services may release documentation (e.g., with use cases) to help application developers integrate SDK X and SDK Y in their mobile applications.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

In one or more embodiments of the invention, the application developer may independently obtain the third-party API keys from the third-party service providers. In such embodiments, the API manager (102) is not involved in the provisioning of the third-party API keys. However, the application developer may still upload the third-party API keys to the API manager (102) using the API client application (218). In other words, the API client application (218) is also used to upload third-party API keys to the API manager (102) that have been obtained/provisioned independently of the API manager (102).

In one or more embodiments of the invention, the API client application (218) is used by application developers to receive and view messages from one or more third-party service providers and to compose and send feedback messages to the third-party service providers.

Although the code (210) for the mobile application is shown as having only one third-party SDK (212) and its corresponding API key (214), those skilled in the art, having the benefit of this detailed description, will appreciate that any number of third-party SDKs and their corresponding API keys may be added to the code (210) and thus included in the mobile application under development.

In one or more embodiments, if the API manager or IDE share any type of information about a first party (e.g., application developer, third-party service provider, mobile device end user, etc.) with a second party (e.g., application developer, third-party service provider, mobile device end user, etc.), the API manager or IDE provides the first party with a notice of the intent to share information and receives consent of the first party before sharing the information.

Figure 3:
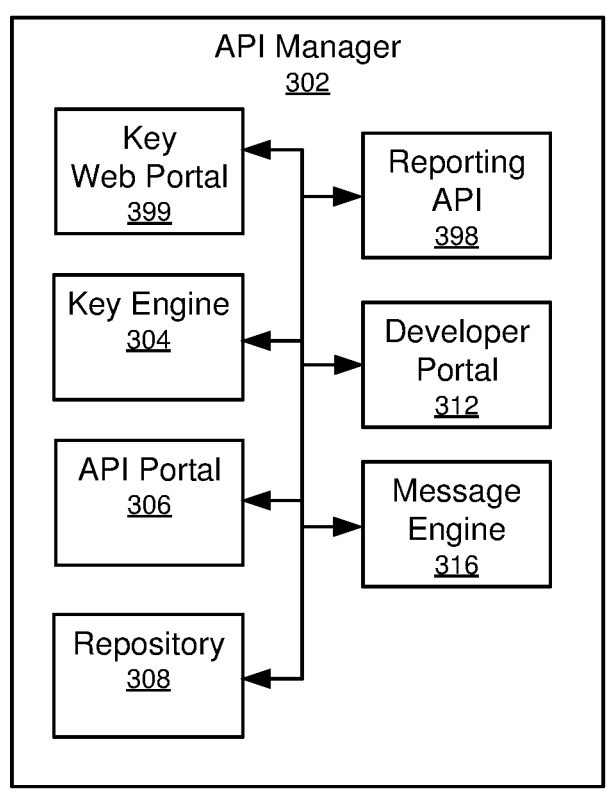
FIG. 3 shows an API manager in accordance with one or more embodiments of the invention.

FIG. 3 shows an API manager (302) in accordance with one or more embodiments of the invention. The API manager (302) may be essentially the same as the API manager (102), discussed above in reference to FIG. 1. As shown in FIG. 3, the API manager (302) has multiple components including, for example, a key engine (304), an API portal (306), a repository (308), a developer portal (312), a message engine (316), a reporting API (398) and a key web portal (399). Each of these components (304, 306, 308, 312, 316, 398, 399) may be located on the same computing device (e.g., server, mainframe, etc.) or may be located on different computing devices connected by networks having wired and/or wireless segments.

In one or more embodiments of the invention, the API manager (302) includes the message engine (316). The message engine (316) facilitates the exchange (e.g., sending, receiving) of messages between third-party service providers and application developer machines connected to the API manager (302). The messages may be in the form of email, text messages, fax, applets, etc. The messaging engine (316) may enable point-to-point messaging (e.g., a message from one third-party service provider to one application developer machine) and/or broadcast messages (e.g., a message from one third-party service provider to many application developer machines). The message engine (316) may provide a directory of all the third-party service providers and application developer machines connected to the API manager (302) in order for the sender to target the recipient. The message engine (316) may archive all exchanged messages for future searching and retrieval.

The content of the messages may include details regarding all the capabilities and functionalities available via the third-party API from the third-party service provider, the parameters that need to be present in any API call, and the permissions necessary to access these capabilities and functionalities. Additionally or alternatively, the content of the messages may include news regarding proposed and/or finalized changes (e.g., upgrades, new versions, etc.) to the available capabilities and functionalities and/or to the third-party API (e.g., changes to the format of API calls). Additionally or alternatively, the content of the messages may include known technical problems or bugs with one or more of the capabilities and functionalities and/or the third-party API.

The content of the messages may include feedback from application developers regarding proposed and/or finalized changes to the third-party APIs. Additionally or alternatively, the content of the messages may include reports of technical problems with third-party APIs discovered by application developers. In one or more embodiments of the invention, messages from the application developers or application developer machines may be referred to as feedback messages.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

In one or more embodiments of the invention, the API manager (302) includes the key engine (304). The key engine (304) is configured to send API key provisioning requests to the third-party service providers. The API key provisioning requests may be sent in response to receiving notifications from an application developer machine, identifying third-party SDKs that have been selected for inclusion (e.g., installation) in a mobile application under development. The API key provisioning requests are sent to the third-party service providers corresponding to the identified third-party SDKs. The API key provisioning requests may include the name of the mobile application under development and/or the name/identifier of the application developer. The key engine (304) may relay the API keys received from the third-party service providers to the application developer machine and store a copy of the API keys. The key engine (304) may also relay and/or store conditions (e.g., permissions, restrictions, etc.) associated with the API keys received from the third-party service providers.

In one or more embodiments, the API manager (302) includes the key web portal (399). Although shown in FIG. 3 as being external to the key engine (304), in other embodiments, the key web portal (399) is a component of the key engine (304). The key web portal (399) may include one or more webpages that are accessible to application developers. Application developers may generate, by manipulating the webpages (e.g., manipulating GUI widgets on the webpages), notifications identifying third-party SDKs that have been selected for inclusion (e.g., installation) in a mobile application under development. The key engine (304) may generate API key provisioning requests (discussed above) based on the notifications and send the API key provisioning requests to the third-party service providers. Further, the API keys received from the third-party service providers may be relayed to the application developers via the key web portal (399). The application developers may need to manually add the received API keys to the code under development. Those skilled in the art, having the benefit of this detailed description, will appreciate that the key web portal (399) may be used additionally and/or alternatively to the API client application (218) and IDE (208).

In one or more embodiments, the key engine (304) sends an API key provisioning request in response to a key request message received from a deployed mobile application executing on a mobile device. The key request message may identify one or more third-party SDKs included in the mobile application. The API key provisioning requests are sent to the third-party service providers corresponding to the identified third-party SDKs. The key request may also identify the mobile device and/or the end user of the mobile device. This information might also be included in the API key provisioning requests. In one or more embodiments of the invention, the key engine (304) receives the key request only after the end-user of the mobile device is authenticated. The key engine (304) may relay the API keys received from the third-party service providers to the mobile application executing on the mobile device and/or may store the API keys. The key engine (304) may also relay and/or store conditions (e.g., permissions, restrictions, etc.) associated with the API keys received from the third-party service providers. In one or more embodiments of the invention, the key request is sent by the default SDK (216) and/or a third-party SDK (212) included in the mobile application (discussed above in reference to FIG. 2).

In one or more embodiments of the invention, the key engine (304) is configured to generate a reference key for the multiple API keys that have been received from third-party service providers. For example, the reference key is generated by hashing one or more of the API keys. As yet another example, the reference key may be a randomly generated alphanumeric or numeric value. The reference key may be sent to the application developer machine while the mobile application is in development in lieu of the API keys themselves. There may be one reference key per API key. Additionally or alternatively, one reference key maps to multiple reference keys. At a future point, the key engine (304) may receive a key request from the mobile application executing on a mobile device. The key request may include the reference key. The key engine (304) may be configured to retrieve the API keys based on the reference key in the key request, and send the API keys to the mobile application. In one or more embodiments of the invention, the key request is sent by the default SDK (216) included in the mobile application.

In one or more embodiments of the invention, the key engine (304) is configured to receive a key cancellation request. The key cancellation request may be received from an application developer. The key cancellation request may be received from an end-user of a mobile device. The key cancellation request may be a notification that previously provisioned API keys have been compromised. The key cancellation request may explicitly identify the API keys. Additionally or alternatively, the key cancellation request may include a reference key that corresponds to the compromised API keys (i.e., the API keys can be determined from the reference key). Additionally or alternatively, the key cancellation request may identify the mobile application having the now compromised API keys. In one or more embodiments of the invention, the key engine (304) is configured to purge the compromised API keys from storage and send new API key provisioning requests to the third-party service providers. The key engine (304) is also configured to receive the newly provisioned API keys from the third-party service providers. The key engine (304) may be configured to send the newly provisioned API keys to one or more mobile applications operated by authorized end-users.

Those skilled in the art, having the benefit of this detailed description, will appreciate that the third-party APIs may reject (e.g., discard, decline, ignore, etc.) any API calls using the compromised API keys after the new API keys are generated.

In one or more embodiments of the invention, the API manager (302) includes the repository (308). The repository (308) stores API keys received from third-party service providers and the conditions associated with the API keys. The repository (308) may also store reference keys with the corresponding API keys. In other words, a reference key may be used to search the repository (308) and retrieve the API key(s) corresponding to the reference key. API keys that are compromised may be deleted from the repository (308). The repository (308) may be implemented as a database, a flat file, or using any type of data structure (e.g., linked-list, array, etc.).

In one or more embodiments of the invention, the API manager (302) includes the developer portal (312). The developer portal (312) may be accessed by application developers over the Internet. The developer portal (312) is configured to receive key view requests from application developers and send data structures (e.g., lists, arrays, etc.) identifying API keys and conditions associated with the API keys in response to the key view requests. The key view request may specify a mobile application and the data structure may identify all the API keys that were provisioned for the third-party SDKs in the mobile application. These data structures may be viewed (e.g., in a GUI), printed, saved by the application developer, etc. The developer portal (312) may also provide the application developer with statistics regarding the number and types of API calls made by each of the developer's mobile applications. In one or more embodiments of the invention, an application developer must be authenticated before the application developer can utilize the services of the developer portal (312).

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

Those skilled in the art, having the benefit of this detailed description, will appreciate that a mobile application may be built by a team of application developers. Each application developer may have a role (e.g., project leader/manager, GUI designers, coders, etc.) in the team. In one or more embodiments of the invention, the developer portal (312) enables the project leader/manager, or some other high ranking team member, to set access privileges (e.g., permissions, etc.) for each member of the team. For example, some members of the team may have privileges to request API keys be provisioned, while other team members do not have such privileges. Other components of the API manager (302)

(e.g., key engine (304)) may need to verify the permissions of the application developer before performing any requests.

In one or more embodiments of the invention, the API manager (302) includes the API portal (306). The API portal (306) may be configured to receive API calls from mobile applications executing on mobile devices, and to relay the API calls to the appropriate third-party APIs. As discussed above, an API key is included with the API call and each API key may include one or more conditions (e.g., number of permissible API calls on a per end-user basis or per mobile device basis, maximum bandwidth consumption, etc.). In one or more embodiments of the invention, the API portal (306) is configured to compare an API call from the mobile device, or a running total of API calls from the mobile device, with one or more conditions of the API keys. If an API call from the mobile device is consistent with (i.e., does not violate) the condition(s), the API call may be relayed to the corresponding third-party API. However, if the API call is not consistent with the condition(s), the API call may be rejected (e.g., discarded, declined, ignored, etc.) before it ever reaches the appropriate third-party API. Those skilled in the art, having the benefit of this detailed description, will appreciate that such embodiments give the API portal (306), and thus the API manager (302), final authority to grant or reject API calls from mobile applications.

In one or more embodiments of the invention, a third-party service providers may periodically change its functionalities, its capabilities, the required format of the API calls (e.g., input values required to be submitted with API calls), etc. The API portal (306) may be configured to receive upgrade notifications regarding these changes from the third-party service providers. However, the mobile applications executing on mobile devices might not be aware of these changes. In one or more embodiments of the invention, the API portal (306) may modify a received API call to be compliant with the upgrade before the API call is sent to the third-party API.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

As discussed above, API calls frequently include/require API keys. In one or more embodiments of the invention, the API portal (306) is configured to receive API calls from the mobile application that do not have the necessary API keys. In such embodiments, the API portal (306) may look-up (i.e., retrieve) the appropriate API key(s) for the end-user, mobile application, and/or mobile device that issued the API call, and modify the API call to include the necessary API key(s) before sending the API call to the appropriate third-party API.

In one or more embodiments of the invention, the API portal (306) is configured to generate reports for each third-party API. The reports may identify the number of mobile applications and/or mobile devices that include the necessary third-party SDK to issue API calls to the third-party API. The reports may identifying the number of API calls that have been modified by the API portal (306) before being sent to the third-party API. The reports may identify the number of API calls that have been rejected by the API portal (306) because one or more conditions were violated.

In one or more embodiments of the invention, the API Manager (302) includes the reporting API (398). As discussed above, a mobile application may issue API calls directly to the third-party services, bypassing the API Manager (302). In one or more embodiments, the third-party service providers themselves may issue API calls to the reporting API (398). These API calls may include usage data (e.g., statistics, metadata, etc.) regarding the API calls made by the mobile applications directly to the third party service providers. For example, the usage data may identify the mobile devices that are making the API calls, the mobile applications that are making the API calls, the frequency of the API calls, reoccurring parameters in the API calls. This usage data may be part of the statistics compiled by the developer portal (312) (discussed above). In other words, this usage data may be shared via the developer portal (312) with one or more application developers. In one or more embodiments, the reporting API (398) is a component of the API portal (306).

Those skilled in the art, having the benefit of this detailed description, will appreciate that the number of components shown in FIG. 3 may be different in different embodiments of the invention. Specifically, the functionality of multiple components shown in FIG. 3 may be performed by a single component in other embodiments of the invention. Similarly, the functionality of a single component shown in FIG. 3 may be split across multiple components in other embodiments of the invention.

Figure 4:
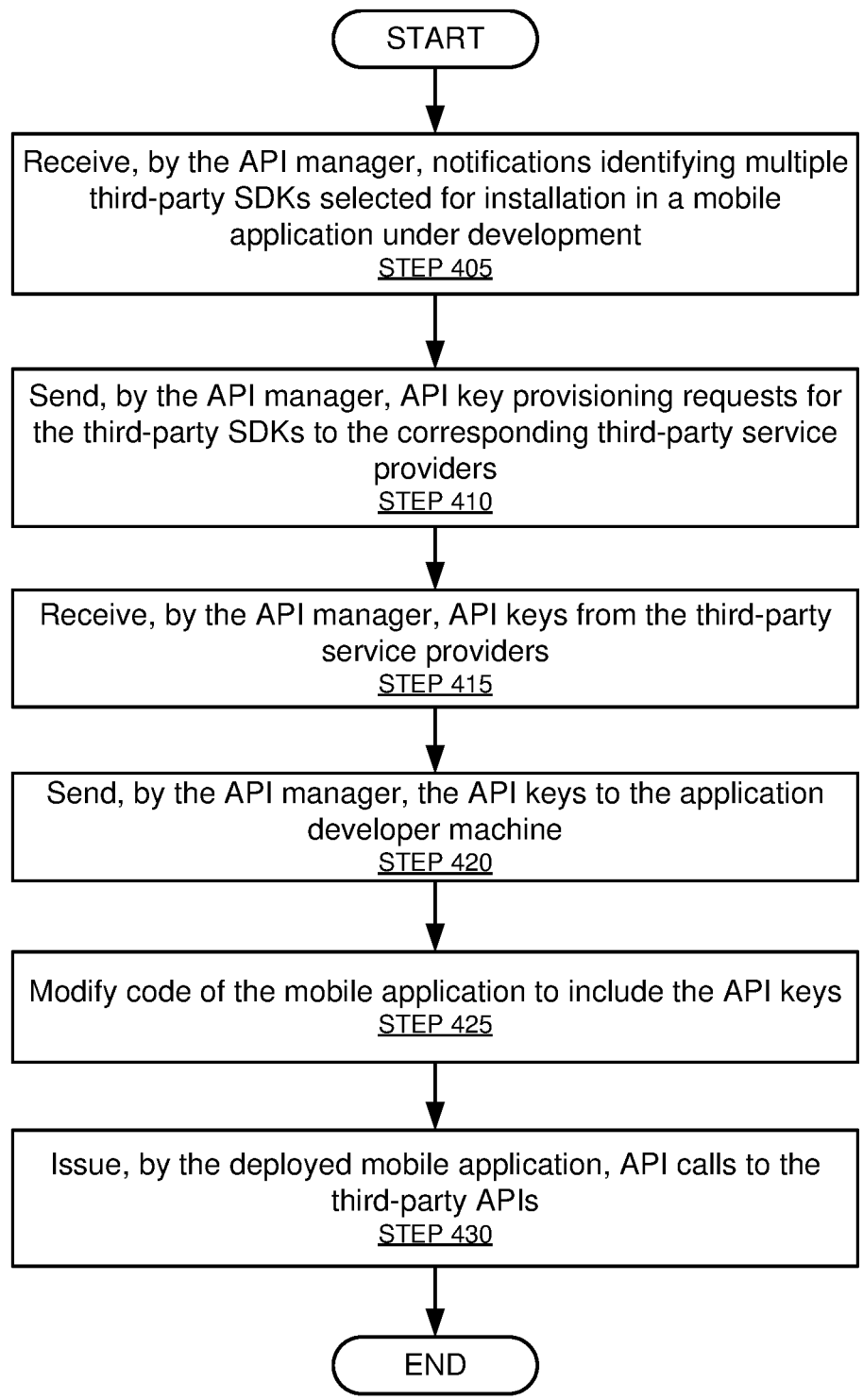
FIGS. 4-8 show flowcharts in accordance with one or more embodiments of the invention.

FIG. 4 shows a flowchart in accordance with one or more embodiments of the invention. The flowchart depicts a process for managing application programming interface (API) keys associated with third-party software development kits (SDKs). One or more of the steps in FIG. 4 may be performed by the components of the system (100), discussed above in reference to FIG. 1, and by the components of the API manager (302), discussed above in reference to FIG. 3. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4. The process depicted in FIG. 4 may be executed before, during, or after the process depicted in any other flowchart disclosed in this detailed description.

Initially, one or more notifications are received identifying one or more third-party SDKs selected for inclusion in a mobile application under development (STEP 405). The notifications may be received by an API manager. The notifications may be issued by an API client application executing on an application developer machine where the mobile application is under development. The notifications may include the name of the mobile application and/or the identity of the application developer. The notifications may also identify the types of mobile devices and/or operating systems the mobile application is targeted to execute on.

In STEP 410, API key provisioning requests are sent to third-party service providers having third-party APIs. As discussed above, each third-party SDK corresponds to a third-party API. Accordingly, for each third-party SDK identified in the notifications, an API key provisioning request is sent to the third-party service provider having the corresponding third-party API. The API key provisioning requests are sent by the API manager to the external third-party service providers. The API key provisioning requests may include the name of the mobile application and/or the identity of the application developer.

In one or more embodiments, if the API manager shares any type of information about a first party (e.g., application developer, third-party service provider, mobile device end user, etc.) with a second party (e.g., application developer, third-party service provider, mobile device end user, etc.), the API manager provides the first party with a notice of the intent to share information and receives consent of the first party before sharing the information.

In STEP 415, one or more API keys are received from the third-party service providers. Specifically, the third-party service providers generated (i.e., provisioned) the API keys and sent them to the API manager. Conditions (e.g., permissions, restrictions, etc.) associated with the API keys may also be received from the third-party service providers. These conditions may be application specific, application developer specific, mobile device specific, and/or end-user specific.

In STEP 420, the API keys may be sent to the API client application executing on the application developer machine where the mobile application is being developed. The API keys and conditions may also be saved by the API manager. A fee may be charged to the application developer for the API keys.

In STEP 425, the code of the mobile application is modified to include the API keys. Specifically, the API client application executing on the application developer machine may modify the code of mobile application to include the API keys with no or minimal input from the application developer. Once the mobile application is complete, it may be deployed for execution on multiple mobile devices.

In STEP 430, the mobile application, deployed and executing on the mobile device, may issue API calls including the API keys to the third-party APIs. Each API call may go through the API manager (i.e., the API manager may receive the API calls and relay them to the appropriate APIs). Additionally or alternatively, the API calls may be issued directly to the third-party APIs, bypassing the API manager.

Figure 5:
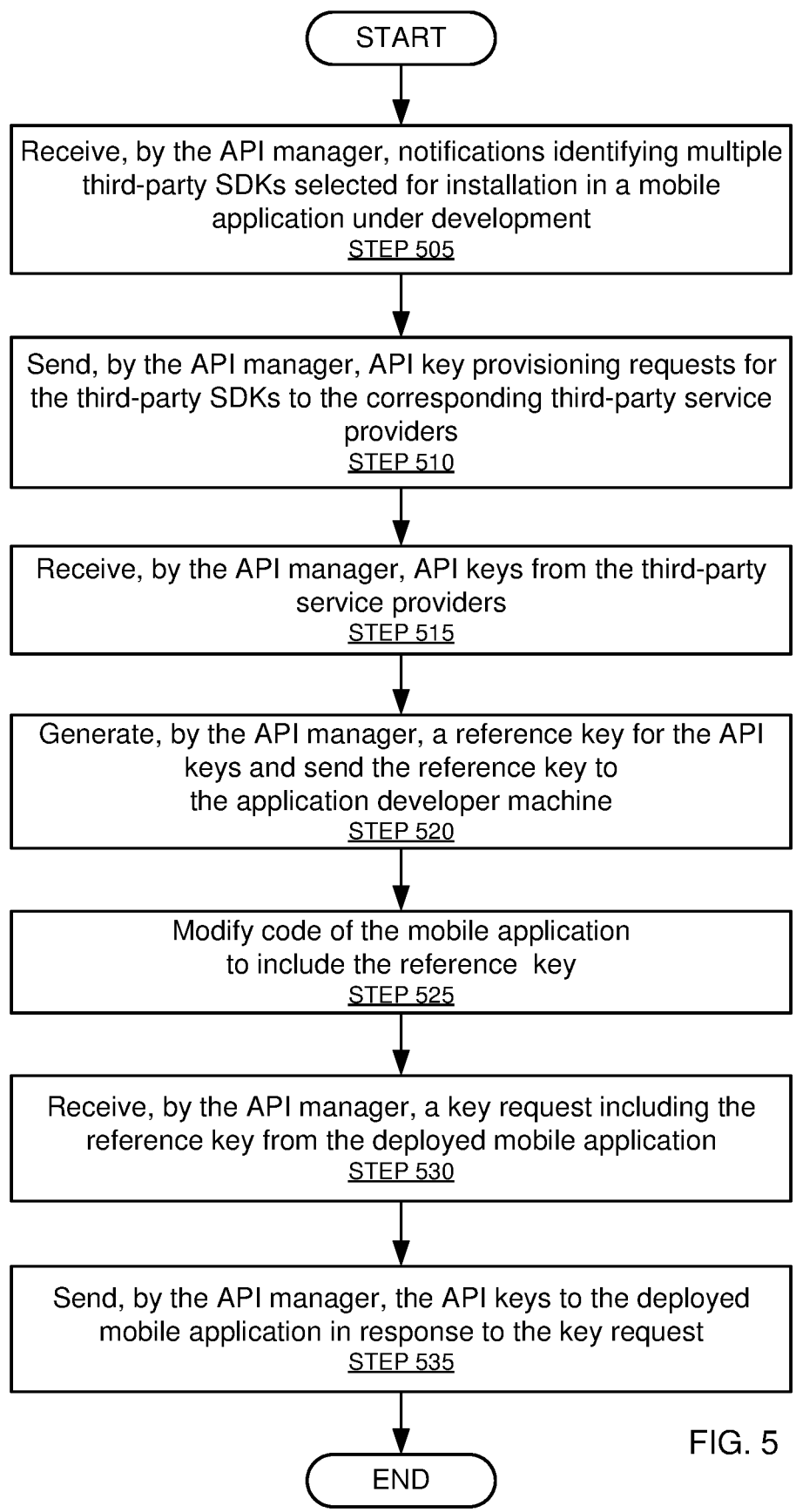

FIG. 5 shows a flowchart in accordance with one or more embodiments of the invention. The flowchart depicts a process for managing application programming interface (API) keys associated with third-party software development kits (SDKs). One or more of the steps in FIG. 5 may be performed by the components of the system (100), discussed above in reference to FIG. 1, and by the components of the API manager (302), discussed above in reference to FIG. 3. In one or more embodiments of the invention, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. The process depicted in FIG. 5 may be executed before, during, or after the process depicted in any other flowchart disclosed in this detailed description.

STEPs 505, 510, and 515 may be essentially the same as STEPs 405, 410, and 415, respectively, as discussed above in reference to FIG. 4.

In STEP 520, a reference key is generated for the API keys. For example, the reference key may generated by applying a hash function to one or more of the API keys. As another example, the reference key may be a randomly generated value. The API keys and the reference key are stored by the API manager. Specifically, the API keys and the reference key are stored such that a future search query including the reference key will return the API keys. The reference key is sent to the API client application. There may be one reference key for each API key. Additionally or alternatively, one reference key may be mapped to multiple API keys.

In STEP 525, the code of the mobile application under development is modified to include the reference key. The mobile application may also be modified to include a default SDK. These modifications may be done with little to no input from the application developer. When the mobile application is complete, it is deployed for execution on multiple mobile devices.

In STEP 530, a key request is received by the API manager. The key request may be received from the deployed mobile application after the operator of the mobile application is authenticated. The key request may be received from a backend of the mobile application after the operator of the mobile application is authenticated by the backend of the mobile application. The key request may be issued by the default SDK included in the mobile application. The key request may include the reference key. In response to the key request, the API manager may retrieve the API keys corresponding to the reference key.

In STEP 535, the API keys are sent to the deployed mobile application. The API keys may be sent by the API manager directly to the deployed mobile application. Additionally or alternatively, the API keys may be sent to the backend of the mobile application, which will then relay the API keys to the mobile application. The mobile application may issue API calls including the API keys to the third-party APIs. Each API call may go through the API manager (i.e., the API manager may receive the API calls and relay them to the appropriate APIs). Additionally or alternatively, the API calls may be issued directly to the third-party APIs, bypassing the API manager.

Additionally or alternatively to the process shown in FIG. 5, the API keys are not sent to the deployed mobile application. Instead, the API calls from the mobile application include the reference key. The API manager receives these API calls having the reference key, replaces the reference key in the API call with the appropriate API key for the third-party API, and then forwards/relays the API call to the appropriate API. The API manager stores the mapping(s) between the reference keys and the API keys. Those skilled in the art, having the benefit of this detailed description, will appreciate that if the reference key is compromised, there is no need to re-provision all the API keys. Instead, only a new reference key needs to be generated for use by the mobile application and the third-party SDKs. Any API calls with the compromised reference key may be discarded without relaying them to the APIs.

Figure 6:
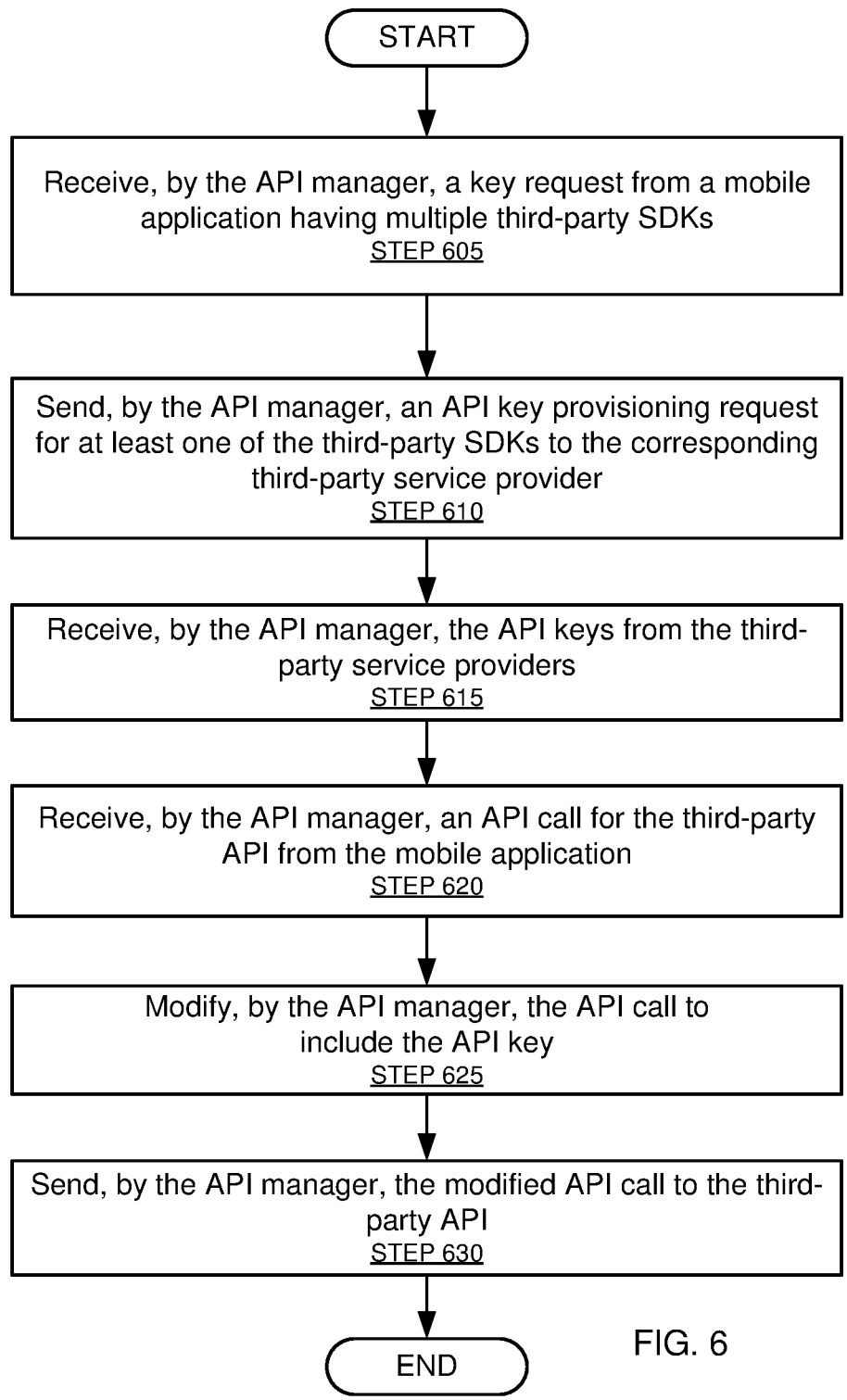

FIG. 6 shows a flowchart in accordance with one or more embodiments of the invention. The flowchart depicts a process for managing application programming interface (API) keys associated with third-party software development kits (SDKs). One or more of the steps in FIG. 6 may be performed by the components of the system (100), discussed above in reference to FIG. 1, and by the components of the API manager (302), discussed above in reference to FIG. 3. In one or more embodiments of the invention, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6. The process depicted in FIG. 6 may be executed before, during, or after the process depicted in any other flowchart disclosed in this detailed description.

Initially, a key request is received from a mobile application executing on a mobile device (STEP 605) (i.e., the mobile application has been deployed). The key request may be received by an API manager. The key request may be issued by a default SDK included with the mobile application. The key request may identify one or more of the third-party SDKs included with the mobile application. The key request may also identify the name of the mobile application and/or the name/identifier of the developer of the mobile application. Additionally or alternatively, the key request may be issued by a third-party SDK included in the mobile application.

In STEP 610, API key provisioning requests are sent to the third-party service providers having third-party APIs. As discussed above, each third-party SDK corresponds to a third-party API. Accordingly, for each third-party SDK identified in the key request, an API key provisioning request is sent to the third-party service provider having the corresponding third-party API.

In STEP 615, one or more API keys are received from the third-party service providers. Specifically, the third-party service providers generated (i.e., provisioned) the API keys and sent them to the API manager. Conditions (e.g., permissions, restrictions, etc.) associated with the API keys may also be received from the third-party service providers. These conditions may be application specific, application developer specific, mobile device specific, and/or end-user specific.

In STEP 620, an API call is received from the mobile application. The API call is received by the API manager. The API call may be issued by one of the third-party SDKs. The API call identifies the targeted third-party API. However, the API call does not include the necessary API key.

In STEP 625, the API call is modified. Specifically, the API call is modified by the API manager to include the necessary API key that was previously provisioned (STEP 615) for the mobile application. In STEP 630, the modified API call is relayed by the API manager to the third-party API.

In one or more embodiments of the invention, the API keys are temporary. Specifically, the API keys are only valid for the current session with the mobile application. The API keys may need to be provisioned again for subsequent sessions.

Figure 7:
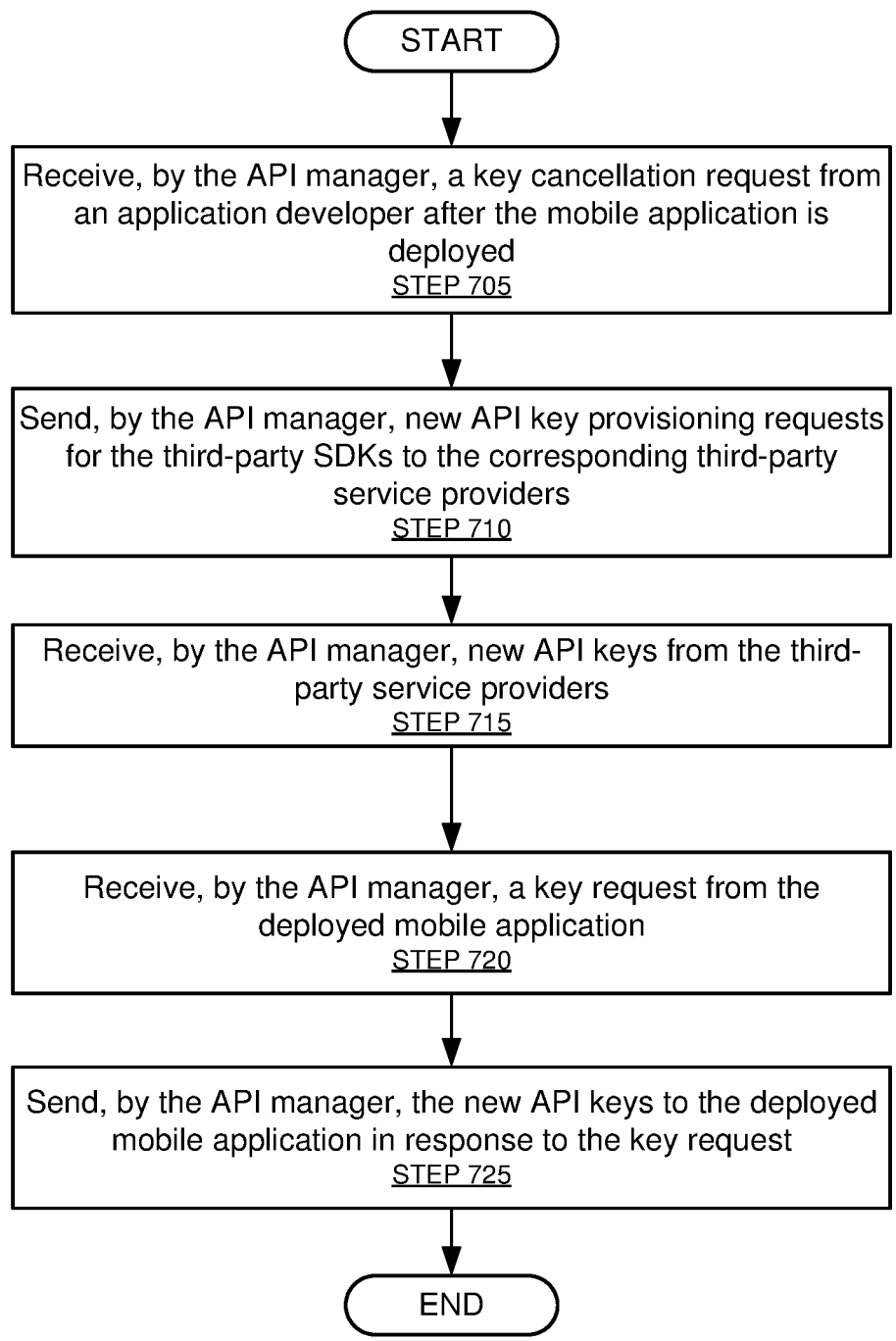

FIG. 7 shows a flowchart in accordance with one or more embodiments of the invention. The flowchart depicts a process for managing application programming interface (API) keys associated with third-party software development kits (SDKs). One or more of the steps in FIG. 7 may be performed by the components of the system (100), discussed above in reference to FIG. 1, and by the components of the API manager (302), discussed above in reference to FIG. 3. In one or more embodiments of the invention, one or more of the steps shown in FIG. 7 may be omitted, repeated, and/or performed in a different order than the order shown in FIG. 7. Accordingly, the scope of the invention should not be considered limited to the specific arrangement of steps shown in FIG. 7. The process depicted in FIG. 7 may be executed before, during, or after the process depicted in any other flowchart disclosed in this detailed description.

Initially, a key cancellation request is received from an application developer (705). The key cancellation request may be received by an API manager after a mobile application created by the application developer has been deployed. Additionally or alternatively, the key cancellation request may be received from the operator of a mobile device executing the mobile application. As discussed above, one or more API keys may have been provisioned for the mobile application. The key cancellation request may be necessary because one or more of the API keys have been compromised. The key cancellation request may identify one or more third-party SDKs included in the mobile application. Additionally or alternatively, the API keys may be determined based on the name of the mobile application in the key cancellation request.

In STEP 710, new API key provisioning requests are sent to the third-party service providers having the corresponding APIs. As discussed above, each third-party SDK corresponds to a third-party API. Accordingly, for each third-party SDK identified in the key cancellation request, an API key provisioning request is sent to the third-party service provider having the corresponding third-party API. The new API key provisioning requests may include the name of the mobile application and/or the identity of the application developer. If the API manager is storing the API keys, these API keys may be deleted in response to key cancellation request. Moreover, once a third-party service provider receives a new API key provisioning request, any API call with the existing API key may be rejected by the third-party API of the service provider. In STEP 715, the new API keys are received by the API manager from the third-party service providers.

In STEP 720, a key request is received from the mobile application. The key request may be received by the API manager. The mobile application issues the key request because the mobile application's existing API keys no longer work (i.e., API calls issued by the mobile application are rejected). The default SDK on the mobile application may issue the key request.

In STEP 725, the new API keys are sent to the deployed mobile application in response to the key request. The mobile application can now resume issuing API calls to the third-party APIs using the new API keys. The third-party APIs may reject any API calls that utilize the now-cancelled API keys.

Figure 8:
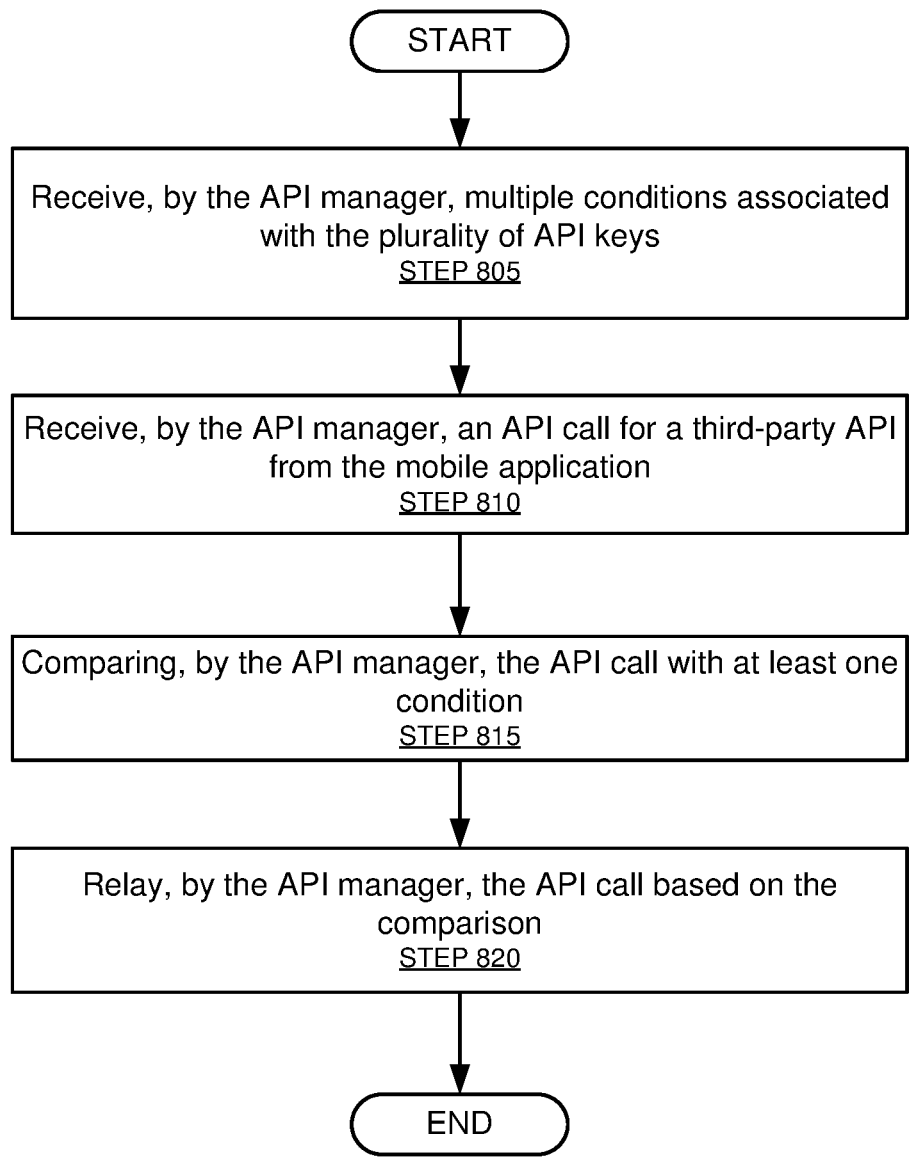

FIG. 8 shows a flowchart in accordance with one or more embodiments of the invention. The flowchart depicts a process for managing application programming interface (API) keys associated with third-party software development kits (SDKs). One or more of the steps in FIG. 8 may be performed by the components of the system (100), discussed above in reference to FIG. 1, and by the components of the API manager (302), discussed above in reference to FIG. 3. In one or more embodiments of the invention, one or more of the steps shown in FIG. 8 may be omitted, repeated, and/or performed in a different order than the order shown in FIG. 8. Accordingly, the scope of the invention should not be considered limited to the specific arrangement of steps shown in FIG. 8. The process depicted in FIG. 8 may be executed before, during, or after the process depicted in any other flowchart disclosed in this detailed description.

In STEP 805, multiple conditions (e.g., permissions, restrictions, etc.) associated with the API keys are received from the third-party service providers. These conditions may be application specific, application developer specific, mobile device specific, and/or end-user specific. Example conditions include a number of permissible API calls on a per end-user basis or per mobile device basis, the maximum bandwidth consumption on a per session, etc.

In STEP 810, an API call for a third-party API is received from a mobile application executing on a mobile device. The API call may be issued by a third-party SDK included with the mobile application.

In STEP 815, the API call is compared with the one or more conditions. Specifically, it is determined whether the API call is consistent with the conditions or violates at least one condition. Assuming no conditions are violated, the API call is relayed by the API manager to the appropriate third-party API (Step 820). Otherwise, if one or more conditions are violated, the API call may be rejected (not shown). Those skilled in the art, having the benefit of this detailed description, will appreciate that the process depicted in FIG. 8 enables the API manager to be the final authority to grant or reject API calls from mobile applications.

Figure 9:
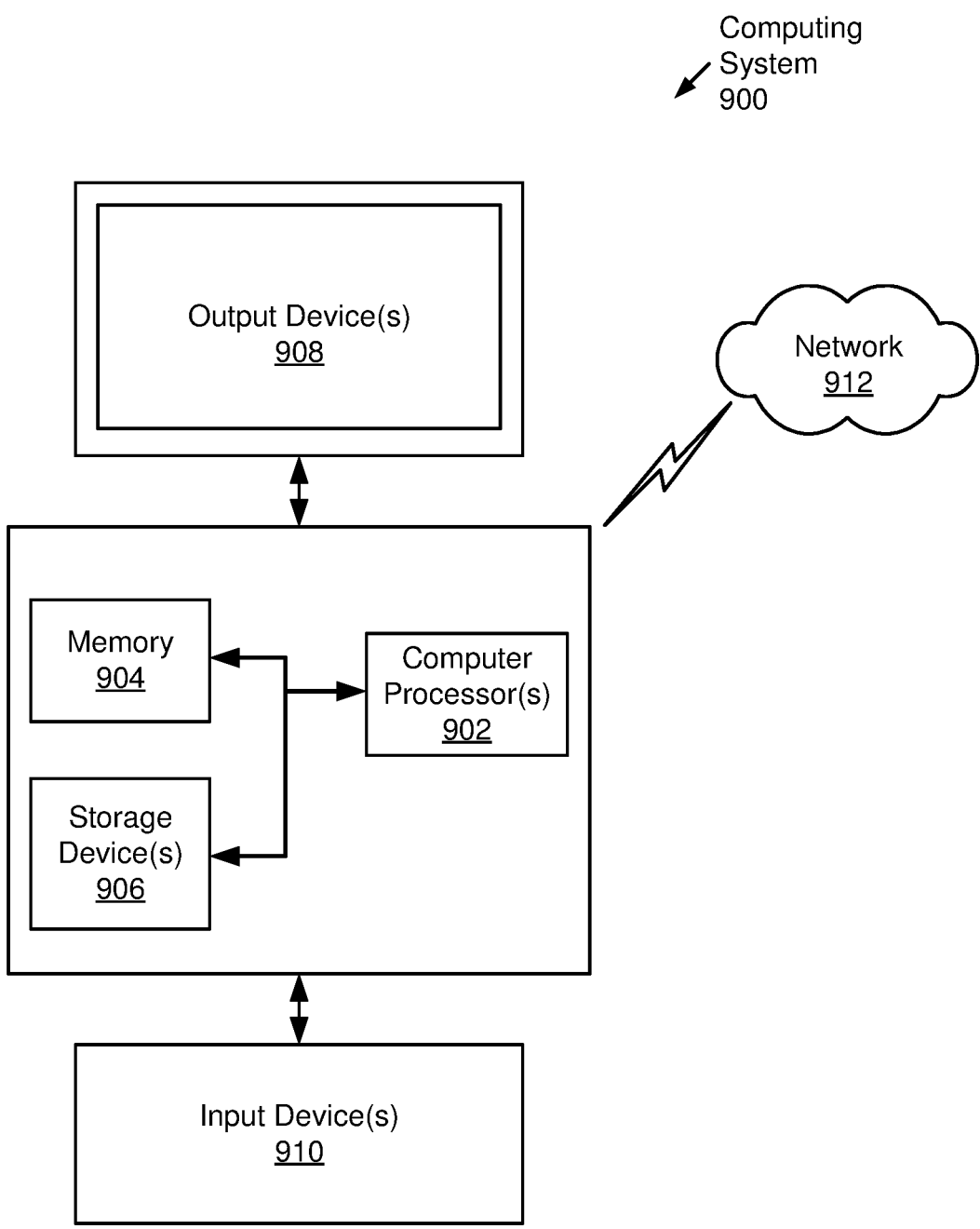
FIG. 9 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor(s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (900) may be located at a remote location and connected to the other elements over a network (912). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method comprising:
   receiving, by an application programming interface (API) manager and from a third-party service provider that provides a third party API, both an API key for the third party API and a condition for the API key;
   storing the condition for the API key in a repository that includes conditions for API keys;
   generating a reference key that maps to the API key;
   providing the reference key to an application developer machine that generates a mobile application to include the reference key;
   receiving, by the API manager and from the mobile application executing on a mobile device, an API call that includes the reference key and is for the third party API;
   identifying the condition for the API key in the repository based on the API call;
   comparing, by the API manager, the API call that includes the API key and is for the third party API with the condition for the API key that was identified from the repository; and
   selectively relaying, by the API manager and based on comparing the API call that includes the API key and is for the third party API with the condition for the API key, the API call to the third party API after replacing the reference key with the API key.

2. The method of claim 1, wherein receiving the API call for the third party API comprises receiving the API call for the third party API from a third-party SDK included with the mobile application executing on the mobile device.

3. The method of claim 1, wherein the condition for the API key corresponds to a permission specified by one or more of the mobile application executing on the mobile device, the mobile device, a developer of the mobile application, and a user of the mobile device.

4. The method of claim 1, wherein the condition for the API key corresponds to a permission that indicates one or more of a number of permissible API calls on a per user basis and a number of permissible API calls on a per mobile device basis.

5. The method of claim 1, wherein the condition for the API key corresponds to a restriction specified by one or more of the mobile application executing on the mobile device, the mobile device, a developer of the mobile application, and a user of the mobile device.

6. The method of claim 1, wherein the condition for the API key corresponds a restriction that indicates a maximum bandwidth consumption on a per session basis of the mobile application executing on the mobile device.

7. The method of claim 1, wherein selectively relaying the API call to the third party API comprises:
determining that the API call to the third party API is consistent with the condition for the API key; and
in response to determining that the API call to the third party API is consistent with the condition for the API key, relaying the API call to the third-party API.

8. The method of claim 1, wherein selectively relaying the API call to the third party API comprises:
determining that the API call to the third party API violates the condition for the API key; and
in response to determining that the API call to the third party API violates the condition for the API key, rejecting the API call to the third-party API.

9. A system comprising:
one or more computers and one or more storage devices storing instructions that are operable, when executed by the one or more computers, to cause the one or more computers to perform operations comprising:
receiving, by an application programming interface (API) manager and from a third-party service provider that provides a third party API, both an API key for the third party API and a condition for the API key;
storing the condition for the API key in a repository that includes conditions for API keys;
generating a reference key that maps to the API key;
providing the reference key to an application developer machine that generates a mobile application to include the reference key;
receiving, by the API manager and from the mobile application executing on a mobile device, an API call that includes the reference key and is for the third party API;
identifying the condition for the API key in the repository based on the API call;
comparing, by the API manager, the API call that includes the API key and is for the third party API with the condition for the API key that was identified from the repository; and
selectively relaying, by the API manager and based on comparing the API call that includes the API key and is for the third party API with the condition for the API key, the API call to the third party API after replacing the reference key with the API key.

10. The system of claim 9, wherein the operation of receiving the API call for the third party API comprises receiving the API call for the third party API from a third-party SDK included with the mobile application executing on the mobile device.

11. The system of claim 9, wherein the condition for the API key corresponds to a permission specified by one or more of the mobile application executing on the mobile device, the mobile device, a developer of the mobile application, and a user of the mobile device.

12. The system of claim 9, wherein the condition for the API key corresponds to a permission that indicates one or more of a number of permissible API calls on a per user basis and a number of permissible API calls on a per mobile device basis.

13. The system of claim 9, wherein the condition for the API key corresponds to a restriction specified by one or more of the mobile application executing on the mobile device, the mobile device, a developer of the mobile application, and a user of the mobile device.

14. The system of claim 13, wherein the condition for the API key corresponds a restriction that indicates a maximum bandwidth consumption on a per session basis of the mobile application executing on the mobile device.

15. A non-transitory computer-readable medium storing software comprising instructions executable by one or more computers which, upon such execution, cause the one or more computers to perform operations comprising:
receiving, by an application programming interface (API) manager and from a third-party service provider that provides a third party API, both an API key for the third party API and a condition for the API key;
storing the condition for the API key in a repository that includes conditions for API keys;
generating a reference key that maps to the API key;
providing the reference key to an application developer machine that generates a mobile application to include the reference key;
receiving, by the API manager and from the mobile application executing on a mobile device, an API call that includes the reference key and is for the third party API;
identifying the condition for the API key in the repository based on the API call;
comparing, by the API manager, the API call that includes the API key and is for the third party API with the condition for the API key that was identified from the repository; and
selectively relaying, by the API manager and based on comparing the API call that includes the API key and is for the third party API with the condition for the API key, the API call to the third party API after replacing the reference key with the API key.

16. The non-transitory computer-readable medium of claim 15, wherein the operation of receiving the API call for the third party API comprises receiving the API call for the third party API from a third-party SDK included with the mobile application executing on the mobile device.

17. The non-transitory computer-readable medium of claim 15, wherein the condition for the API key corresponds to a permission specified by one or more of the mobile application executing on the mobile device, the mobile device, a developer of the mobile application, and a user of the mobile device.

18. The non-transitory computer-readable medium of claim 15, wherein the condition for the API key corresponds to a permission that indicates one or more of a number of permissible API calls on a per user basis and a number of permissible API calls on a per mobile device basis.

19. The non-transitory computer-readable medium of claim 15, wherein the condition for the API key corresponds to a restriction specified by one or more of the mobile application executing on the mobile device, the mobile device, a developer of the mobile application, and a user of the mobile device.

* * * * *

UNITED STATES PATENT AND TRADEMARK OFFICE
CERTIFICATE OF CORRECTION

PATENT NO. : 10,585,727 B1
APPLICATION NO. : 15/596751
DATED : March 10, 2020
INVENTOR(S) : Bolton et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 200 days.

Signed and Sealed this
Twenty-fourth Day of November, 2020

Andrei Iancu
*Director of the United States Patent and Trademark Office*